United States Patent [19]

Maeda

[11] Patent Number: 4,805,341
[45] Date of Patent: Feb. 21, 1989

[54] METHOD OF EXTERMINATING INSECTS UNDER THE FLOOR OF A HOUSE OR BUILDING

[76] Inventor: Hiroshi Maeda, No. 26-2, Suberiiwahama, Ookuwajima, Muya-cho, Naruto-shi, Tokushima-ken, Japan, 772

[21] Appl. No.: 137,324

[22] Filed: Dec. 23, 1987

[51] Int. Cl.$^4$ .............................................. A01M 9/00
[52] U.S. Cl. ........................................ 43/132.1; 239/3
[58] Field of Search ............... 43/132.1, 124; 239/654, 239/3

[56] References Cited

U.S. PATENT DOCUMENTS

| | | | |
|---|---|---|---|
| 2,657,339 | 10/1953 | Hampe | 239/654 |
| 4,553,698 | 11/1985 | Parker | 239/3 |
| 4,648,202 | 3/1987 | Renth | 43/132.1 |

*Primary Examiner*—Gene P. Crosby
*Attorney, Agent, or Firm*—Wenderoth, Lind & Ponack

[57] ABSTRACT

A method of exterminating harmful insects under the floor of a house or building comprises spraying insecticide into the enclosed area under the floor of the house or building. The insecticide used, is in the form of a fine powder which is loaded into an airtight dispenser. The dispenser has an opening for the insecticide to pass through. The opening is initially blocked by insecticide while pressure inside the dispenser is increased. Subsequently, insecticide is forced out the dispenser opening and delivered to a nozzle which sprays the insecticide under the building floor at a high exit velocity. The insecticide forced from the dispenser is delivered to the nozzle at a high flow rate through a hose with at least an inner surface of synthetic resin with a high electrical resistance. Insecticide is charged with static electricity through friction with the synthetic resin inner surface of the hose. The fine powder insecticide adheres to all exposed surfaces and inside crevices in the area under the building floor.

2 Claims, 2 Drawing Sheets

METHOD OF EXTERMINATING INSECTS UNDER THE FLOOR OF A HOUSE OR BUILDING

BACKGROUND OF THE INVENTION

The present invention relates to a method of exterminating termites and similar harmful insects living in, or traversing the area under a house or building. More specifically, this invention relates to a method of exterminating harmful insects in which insecticide effectively adheres to all exposed surfaces in the area under the house or building. For the purposes of this patent application the meaning of the word insecticide encompasses substances which deter insect presence as well as substances which kill insects.

Application of insecticide under buildings and houses to exterminate termites is currently performed, and has been performed in the past. Former methods require workers to wear totally protective clothing, gloves, and gas masks, crawl under the building, and disperse chlordane or other insecticides over the entire exposed ground and/or coat wooden beams such as the groundsills with insecticide.

These former methods of applying insecticide are not only extremely laborious, but also require exterminators to work for long periods in the confined area under a building while breathing poisonous insecticide fumes. Hence, the work environment is extremely bad. Furthermore, these methods have the drawback that complete insecticide coverage in very cramped areas is impossible. Some houses and buildings have very small, confined regions that cannot be reached to apply insecticide.

In particular, it is extremely difficult for a worker, inside the area under a building, to apply insecticide with a brush or similar applicator in narrow gaps such as those between the floor boards. It is possible to apply liquid insecticide to the gaps and crevices even in confined areas by spraying. However, with this method atomized droplets of the sprayed insecticide float in the air under the building, and unfortunately, gas masks can not completely eliminate the poisonous particles. Hence, working conditions are made worse by making the worker breathe insecticide droplets. For the worker's protection, liquid insecticide application is restricted to organophosphate type insecticides with dispenser pressures of 5 Kg./square cm. and below. It is impossible for exterminators to work for long periods in this type of hazardous environment, and it is therefore impossible to entirely cover the area under a building with insecticide by these methods.

In cases where total coverage is impossible, termites will establish a route into the home or building through the area where insecticide has not been applied. For example, even though the area under a building may be almost entirely covered with insecticide, one uncovered area will drastically reduce the extermination effectiveness within the entire building.

By former methods where workers enter the enclosed area under a building and disperse and/or apply insecticide with a brush, not only is it impossible to entirely cover all the exposed surfaces, but it is clearly impossible to apply insecticide in all the narrow crevices, as well as open areas exposed only through narrow crevices.

For these reasons, recently adopted methods of insecticide application basically involve coating the entire surface of the ground under the building with organic salt type insecticides such as chlordane, which do not degrade easily, and hence remain effective for extremely long periods. These methods take advantage of the ease of application to the ground surface, and prevent insect penetration at that point.

However, it is presumed that these techniques may bring about serious environmental pollution problems in the future, and the use of chlordane has been outlawed in Japan.

As mentioned, insecticides like chlordane have the special attribute that they remain on or in the ground without degrading, and hence provide long term effectiveness against harmful insects. On the other hand, it is impossible to keep the insecticide within the area under the building forever, and the substance inevitably seeps into the ground water along with rain water to pollute plants and vegetables, domestic animals which feed on the plants, and humans that eat the plants and animals. According to recent reports, chlordane has been detected even in animals of the south pole, which is assumed to be the most unpolluted location on earth.

It has recently been proposed that organophosphates be used instead of organic salt type insecticides. Organic salt type insecticides gradually accumulate in the human body over a long period, and when the accumulated quantity exceeds a critical value, severe impairment results without warning. By the time symptoms are recognized, it is too late for treatment, and recovery is impossible. Conversely, even a small quantity of organophosphate type insecticide attached to the skin or breathed into the body has a strong poisonous reaction which can be immediately treated. However, even though treatment can normally be performed in time, since organophosphates are extremely poisonous to humans, workers must take preventive measures that would not even be considered using chlordane. During the application of organophosphates, people in the vicinity of the house or building as well as those in the building must be evacuated, and particular care must be taken to insure that atomized insecticide does not leak out of the enclosed area under the building.

An ideal harmful insect extermination method could be realized with an insecticide which degrades rapidly in the ground yet has sufficient strength to exterminate insects. Unfortunately, since such insecticides are applied to the ground, they loose effectiveness rapidly, and long term effective harmful insect extermination is impossible.

The inventor proposed that workers remain outside the area under the building, and that harmful insect penetration into the building be stopped at the foundation, the groundsills, the support beams, the floor beams, and the floor boards, rather than at the ground. With this in mindhe has experimented with various application methods.

The first experiment attempted to obtain complete coverage by spraying liquid insecticide, atomized by compressed air pressure, from a nozzle inserted into the area under the building. Although insecticide coverage by this method was obtained in the vicinity of the nozzle, complete coverage of all the exposed surfaces in the enclosed area under the building could not be accomplished. The inventor performed many experiments varying the nozzle shape, the nozzle opening size, the compressed air pressure, etc., but was unable to realize complete adhesion of insecticide in the area under the building.

In further experiments applying different methods, the inventor was able increase the specific gravity of ejected particles of a solid insecticide in powdered form, independent of the compressed air pressure, and accelerate uniformly sized particles to a high ejection velocity using high air pressures. Further, by unidirectional acceleration of the body of ejected particles the inventor was successful in adhering insecticide to all surfaces, crevices, and areas accessible only through narrow crevices, from outside the enclosed area under the building, to a degree unimaginable by former methods.

Unfortunately, this method has the drawback that most of the insecticide sprayed into the area under the building floor falls to the ground and the insectide's effectiveness is thereby reduced.

The effectiveness of the insecticide can be increased by adjusting its adhesive properties. For example, adhesion can be improved by spraying a mixture of insecticide and bonding adhesive compound This method has the drawbacks that a complicated sprayer configuration is required to simultaneously eject insecticide and adhesive, and excessive labor is required to handle these substances and complex equipment. Another drawback results from the demand for a bonding adhesive compound having special properties that allow it to be sprayed as a liquid in unhardened form, and that allow it to harden such that the effectiveness of the insecticide is not reduced by adhesive encapsulation. Namely, it is difficult to select the proper adhesive and insecticide mixture ratio, the proper adhesiveness, and the proper chemical variety of bonding adhesive compound for spraying. A further drawback arises from laborious cleanup procedures which require complete removal of all insecticide and adhesive mixture from the spraying system, as well as drying the cleaned parts.

The inventor investigated the possibility of improving the adhesiveness of the insecticide by adjustment of the physical properties of the insecticide substance. Fortunately, investigation showed that almost without exception the insecticides used had a high electrical resistance and their adhesiveness could be improved with a static electric charge.

Technology for charging airborne floating particles has been previously developed for static electric dust collecting equipment. By these methods, several thousand volts is established between two thin parallel wires, and particulates passing through the interval between the wires are charged by a weak electrical discharge in that interval. This technique can be used to electrically charge an insecticide by arranging two thin wires charged with a high voltage at the exit of the insecticide spray nozzle. Adhesive strength obtained by charging the insecticide with static electricity allows effective coating of all the exposed areas under the building, and in particular allows effective adhesion of insecticide to vertical surfaces as well as to the underside of the floor. Insecticide having the adhesive strength to attach to the underside of the floor can completely coat all surfaces producing outstanding pest extermination and deterance.

However, this method requires the use of several thousands of volts of electricity, and is therefore a relatively dangerous operation. Handling procedures are complicated by the necessity to avoid electrical shock, and a high voltage power supply is required making the spraying equipment very expensive.

It is a major objective of this invention to develop a method of exterminating insects under the floor of a house or building, which overcomes the above drawbacks and increases the insecticide's pest extermination effectiveness by forcibly coating all exposed surfaces using an extremely simple method of charging the insecticide with frictional static electricity thereby eliminating the need for an insecticide charging power supply or particularly expensive spraying equipment.

Another major objective of this invention is to provide a highly effective method of exterminating insects under the floor of a house or building, by which all exposed surfaces can be completely covered with insecticide applied by a simple procedure by workers outside the area under the building.

A further major objective of this invention is to attach insecticide to, and completely cover the foundation, groundsills, support beams, floor beams, and floor boards, thus allowing extermination using insecticides which degrade in the ground over a short period, and thus drastically reducing environmental pollution.

Still another major objective of this invention is to apply insecticide without requiring workers to enter the enclosed area under the building, thus allowing application even under low to the ground floors where workers cannot enter, as well as greatly improving working conditions by avoiding insecticide ingestion.

Another major objective of this invention is to use compressed air pressure to accelerate insecticide into the enclosed area under a building without introducing large quantities of air, and hence, to minimize the leakage of insecticide outside of that area during application.

BRIEF DESCRIPTION OF THE ILLUSTRATIONS

DETAILED DESCRIPTION

The following provides an illustrated description of a practical example of the present invention: a method of exterminating insects under the floor of a house or building.

Figure 1:
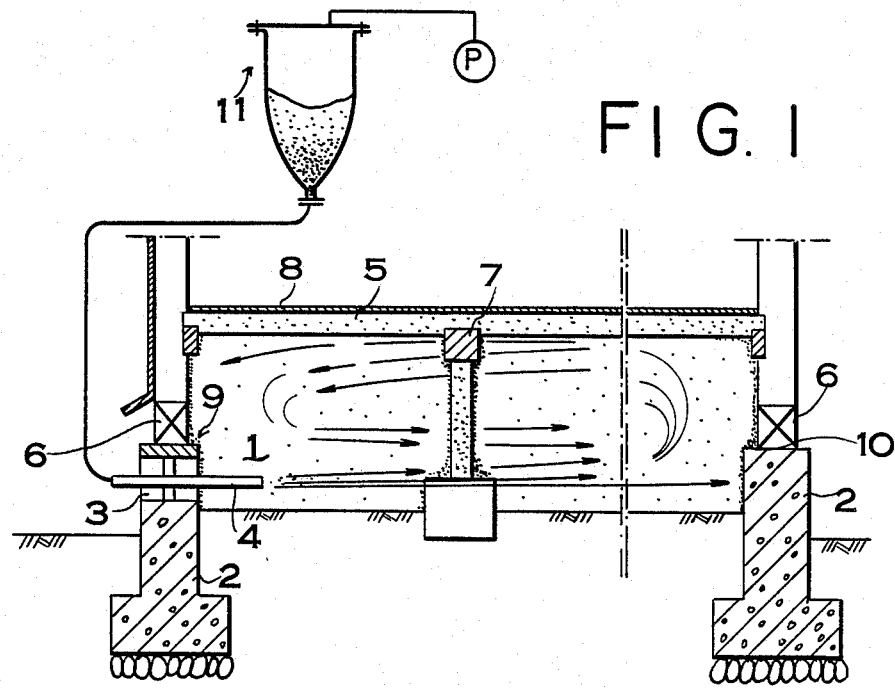
FIG. 1 is a cutaway view of an example of the use of this invention under the floor of a building.

As shown in FIG. 1, the end of a nozzle 4 is inserted into the enclosed area 1 under the floor of the building through a ventilation hole 3 in the foundation 2. Insecticide in a powdered form is sprayed, at a high exit velocity from the nozzle 4, by air pressure.

Insecticide is ejected from the nozzle after being charged by frictional static electricity. The frictional static electric charge is produced by high speed passage of insecticide through a hose with a synthetic resin inner surface. Namely, insecticide rubs against the highly electrically resistant synthetic resin hose surface to create frictional electricity and thereby obtain a high voltage charge. The strength of the frictional electric charge increases with the pressure at which the insecticide is forced against the inner surface of the hose, and also increases with the flow velocity and length of passage through the hose.

Consequently, air pressure for forcing insecticide through synthetic resin inner surface of the hose should normally be between 2 and 15 Kg./square cm., the flow rate of the insecticide through the hose should be greater than or equal to 5 m./sec., and the overall length of the hose should be greater than or equal to 5 m. Insecticide forced by high pressure air to pass through, and rub against the synthetic resin inner surface of the hose at a high flow rate is charged to a high voltage by frictional electricity created during that passage.

In order to electrically charge insecticide passing through, and creating friction with the hose inner surface, the hose has at least its inner surface made of low conductivity high resistivity synthetic resin. The hose may therefore have a high resistivity synthetic resin inner surface or be made entirely of high resistivity synthetic resin.

The insecticide used, is in the form of a fine powder, with the particle size chosen such that the particles will remain airborne for a given period. The average particle size is less than 100 mesh (where the mesh value indicates the size of a particle which will pass through a mesh with that number of mesh openings per square inch), or more desirably less than 200 mesh. The airborne particles, which mix, and spread with the disturbed air, are charged by frictional electricity giving them a strong adhesive property in addition to their inherent adhesiveness thereby facilitating contact with, and attachment to the concrete foundation 2, the wooden groundsills 6, the floor beams 5, the support beams 7, and the floor boards 8.

Insecticide in the powdered form has an apparent specific gravity greater than 0.6, and a single atomized particle of powdered insecticide has a specific gravity greater than that of a single atomized particle of liquid insecticide. It follows that powdered insecticide particles accelerated by air pressure and sprayed into the air possess a large kinetic energy. On the other hand, the particles of powdered insecticide also have an extremely large area to weight ratio resulting in large aerodynamic drag. Therefore, the sprayed insecticide particles do not quickly fall to the ground, but rather can remain afloat in the air under the building floor for a period of time.

The desirable apparent specific gravity of the powdered insecticide used in this invention is chosen to be between 0.6 and 1.6.

Extremely finely powdered insecticide, with its inherent adhesiveness supplemented by frictional electric adhesion, will stick to all the exposed surfaces under the building floor. In particular, it will adhere well even to the vertical surfaces of the foundation 2, the floor beams 5, and the support beams 7, as well as to the under surfaces of the floor boards 8. To make the insecticide, applied in this state, even more permanent, small quantities of a bonding adhesive compound may be mixed with, or sprayed together with the insecticide.

Bonding adhesives, like urethane or epoxy type adhesives can be used for mixing with the insecticide. To avoid clogging of the inseticide-bonding adhesive mixture prior to ejection from the nozzle, the bonding adhesive may be mixed into the insecticide at the tip of the nozzle. Since the applied insecticide's effectiveness is greatly reduced if it is completely covered by bonding adhesive, the amount of bonding adhesive is chosen to be 10% or less, by weight, of the mixture, and more desirably, 5% or less.

The flow rate and exit velocity of the insecticide from the nozzle can be adjusted by the air pressure applied inside the insecticide dispenser and the diameter of the nozzle opening. Increasing the air pressure increases the insecticide flow rate and exit velocity from the nozzle. Accordingly, high air pressure increases the amount of frictional electric charge mentioned previously, reduces the insecticide spraying time into the area under the building floor, and also increases the flow energy of the insecticide into the air. This increases the degree of disturbance of the air under the building floor, and enables insecticide to get into even the narrowest crevices. However, if the dynamic pressure of the jet of insecticide is too high, friction and abrasion in the hosing and nozzle become appreciable, and further, the insecticide dispenser and compressed air source must be high pressure equipment. Insecticide sprayed under the building floor with a pressure on the order of 2 Kg./square cm. is forcefully stirred around with the air to coat all the exposed surfaces, adhere in crevices, and penetrate into hidden areas exposed through crevices. Therefore, even from consideration of insecticide ejection from the nozzle, the compressed air pressure is set, as mentioned previously, in the 2 to 15 Kg./square cm. range, and ideally is chosen in the 4 to 10 Kg./square cm. range.

The nozzle diameter is normally set between 1 and 20 mm., and ideally is chosen to be between 3 and 10 mm.

In experiments performed by the inventor, 5 Kg. of insecticide were applied in 1 min with a nozzle diameter of 6 mm and an air pressure of 6 Kg./square cm.

The quantity of insecticide applied is established by considering the effectiveness of the insecticide, its specific gravity, and the degree of extermination desired, etc. Normally, for carbamate type insecticides, a 1 square m. area is sprayed with 8 to 400 g of insecticide, and ideally a quantity between 15 and 150 g is applied. This application quantity also does not vary greatly for insecticides other than carbamate types.

Insecticide application by the method of this invention does not involve the introduction of a large quantity of air under the building floor. For this reason, there is essentially no leakage of insecticide mixed air from the enclosed area under the building floor during application. Ideally, ventilation holes are plugged, and insecticide is sprayed into an airtight area under the building floor. In this situation, a small amount of air is also injected along with the insecticide, and the pressure in the enclosed area increases slightly. This pressure differential allows more effective penetration of crevices, as well as hidden regions exposed through crevices, in the area under the building floor.

Figure 2:
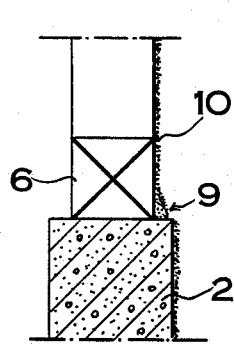
FIG. 2 is a cutaway view of an example of insecticide accumulation in a line along the foundation.

The application method of this invention effectively adheres insecticide to all exposed surfaces under the floor of a house or building by charging the insecticide with frictional electricity. Further improved effectiveness over a long period can be obtained by establishing an accumulation 9 of insecticide along the edge at the top of the foundation 2. This accumulation 9 of insecticide forms a continuous line along the top of the foundation 2 when, as shown in FIG. 2, the foundation 2 is made wider than the groundsills 6 to form a shelf on top of the inside wall of the foundation 2. Otherwise, an accumulation of insecticide is formed in the gap between the foundation 2 and the groundsills 6. In addition to being piled up in a large quantity, this accumulation 9 of insecticide occurs on the top of a horizontal surface. Thus, even if the house or building vibrates, or even if the insecticide's adhesion weakens, compared with the insecticide on vertical surfaces or on the under surfaces of the floor boards, it remains in place. Furthermore, since the accumulation is established all along the top edge of the foundation, the invasion of pests into the house or building can be stopped here. In particular, this realizes the feature that termites, that enter from inside the foundation walls, are kept out of the house or building.

The amount of insecticide which adheres to the vertical walls and under surfaces of the foundation 2, the groundsills 6, the support beams 7, the floor beams 5, and the floor boards 8 can be increased if these surfaces are rough rather than smooth. This construction results from the use of composite concrete framework boards rather than smooth metal plates to form the foundation 2, and the use of unsanded and unsmoothed raw lumber to make the groundsills 6, the support beams 7, the floor beams 5, and the floor boards 8.

Figure 3:
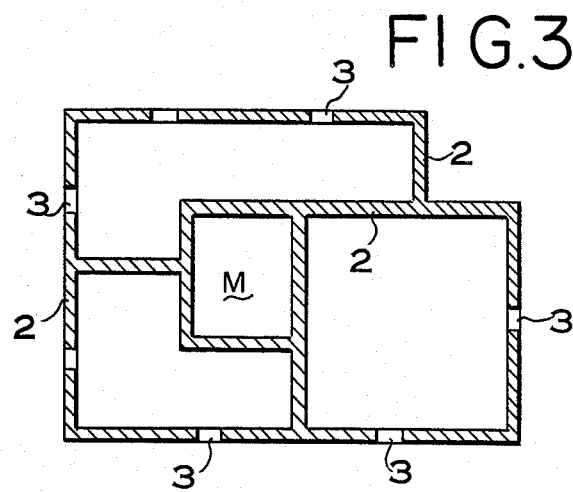
FIG. 3 is a plan view of an example of a foundation layout.

As shown in the overhead view of the foundation 2 in FIG. 3, most of the area under the building can be sprayed from the outside through ventilation holes 3 in the foundation. However, as in FIG. 3, the central region M may not have ventilation holes. For this case, the flooring, or floor covering, over this region is temporarily removed, and either a small hole for the insecticide nozzle is opened in one of the floor boards, or else a gap wide enough for the nozzle is searched for. Once the end of the nozzle is inserted into the central region, insecticide is sprayed into that region.

Insecticide is loaded into an airtight sealed dispenser and covers the bottom of that dispenser where an opening connects to a nozzle by means of a hose. Any system which will forcefully eject insecticide by pressurization of the dispenser with compressed air can be used.

Figure 4:
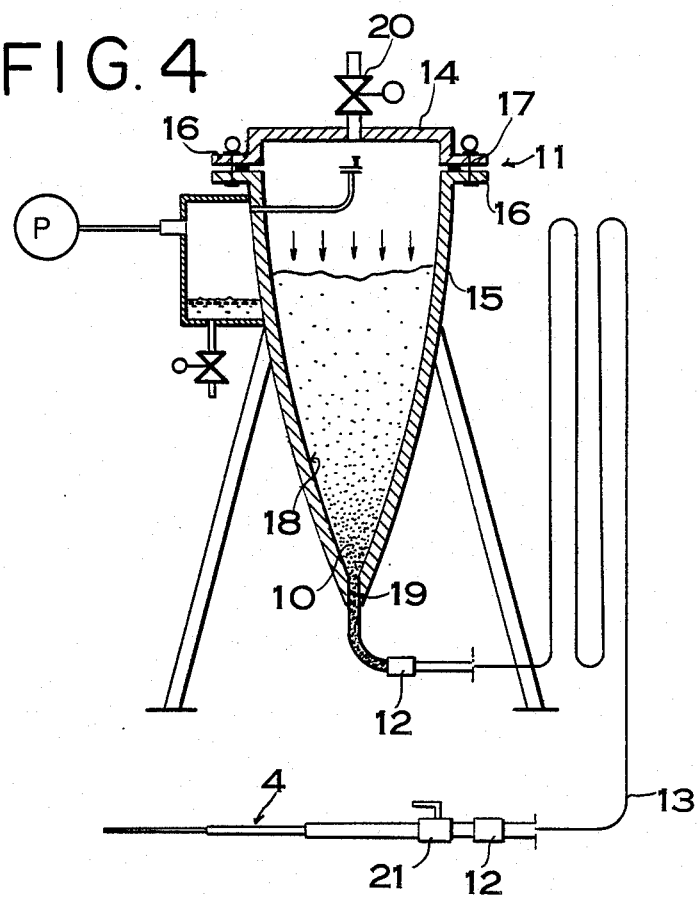
FIG. 4 is a cutaway view of an example of an insecticide spraying device used by this invention.
Figure 5:
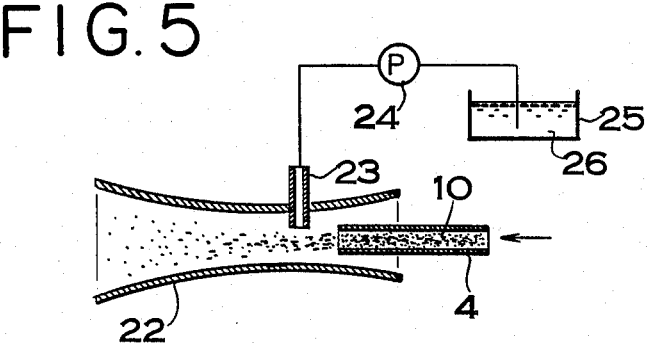
FIG. 5 is a cutaway view of an example of the spraying nozzle.

An example of such a dispenser is illustrated in FIG. 4, This dispenser comprises an insecticide container 11, a connector 12 at the bottom of the container 11, which allows free connection and disconnection of the highly electrically resistant synthetic resin hose 13, which electrically charges insecticide passing to a nozzle 4 connected to the end of the hose 13, and a compressed air source P, which delivers compressed air to the container 11.

The container 11 has a lid 14 at the top, which allows opening and closing of the top of the container to load insecticide 10, etc. When the lid 14 is closed it forms an airtight seal. This airtight seal is realized by tightening bolts through flanges 16 on the lid 14, and on the container base 15, thus sandwiching a rubber O-ring or gasket 17 between the mating surfaces of the flanges 16.

The container 11 is a metal, high pressure vessel constructed to amply withstand interior pressurization during insecticide delivery.

The container 11 shown in FIG. 4 has an overall cylindrical shape with a conically tapered end at the bottom. Compressed air exerts pressure on the top of the insecticide 10 loaded in the container 11. If compressed air passes through the insecticide 10 and is ejected together with the insecticide, a large quantity of air is introduced under the building with the insecticide 10, and large quantities of insecticide are discharged from the area under the building. To avoid this undesirable effect, the container 11 is normally constructed with a height of 20 cm. to 1.5 m, and ideally, with a height greater than 50 cm., and the slope of the conically tapered bottom 18 is made greater than 45 degrees, and ideally, greater than 50 degrees with respect to horizontal.

Pressure is applied to the surface of the insecticide 10 inside the container 11 by the compressed air above. An insecticide outlet opening 19 for the delivery of pressurized insecticide is provided at the bottom of the conically tapered portion of the container 11, where insecticide collects due to the steep walls 18 of the tapered portion.

As shown in FIG. 4, a vent 20 is provided in the lid 14 to release compressed air inside the container base 15. Prior to opening the lid 14, the vent 20 should be opened, and the pressure inside the container base 15 should be reduced to atmospheric.

The synthetic resin hose 13 can be made entirely of synthetic resin with reinforcing fibers embedded in the resin, or it can be a cloth fiber hose with the inner surface coated with highly electrically resistant synthetic resin.

An insecticide spray adjust valve 21 regulates pressure in the delivery line comprising the bottom opening 19, the hosing 13, and the nozzle 4. As shown in FIG. 4, the most convenient location for the spray adjust valve 21 is on the nozzle 4, in easy reach of the operator, and at the source of the insecticide jet.

Further, the nozzle 4 is made as a telescoping structure for convenience of use. The nozzle 4 joins to the hosing 13 through a connector 12.

Any source which can deliver compressed air, for example, an air compressor, etc. can be used as the compressed air source P. However, since the insecticide spraying device used in this invention consumes little air, a small bottle of compressed gas may also be used as the compressed air source.

FIG. 5 shows an example of a nozzle which atomizes liquid bonding adhesive together with insecticide. As illustrated, a venturi 22, with a liquid bonding adhesive nozzle 23 inserted at the low pressure point, is fixed to the end of the insecticide nozzle 21. The bonding adhesive nozzle 23 is either directly connected to the liquid bonding adhesive dispenser 25, or else it is connected to that dispenser through a delivery pump 24.

When insecticide is sprayed through this nozzle, liquid bonding adhesive 26 is sucked into the rapidly flowing stream of insecticide in the venturi 22 by the action of Bernoulli's principle. The bonding adhesive 26 mixes with the insecticide 20, and is sprayed into the air under the building. The atomized particles of this mixture are distributed to the exposed surfaces under the building by air turbulence created by the insecticide jet. In this case, since insecticide adheres to surfaces through the action of the bonding adhesive, insecticide can be solidly attached to surfaces without coming loose for long periods.

To establish a narrow jet of atomized insecticide, the end of the nozzle 21 is either a cylindrical pipe, or else the end of the pipe narrows down to a smaller diameter.

The method of using the insecticide spraying device of FIG. 4 is as follows. The lid 14 of the insecticide dispenser container 11 is closed and sealed to an airtight seal after insecticide 10 has been loaded into the container base 15. Compressed air is introduced into the container base 15 from the compressed air source P. At this stage, when the spray adjust valve 21 is opened, insecticide 10 is forced out of the container 11 and into the hose 13. Insecticide 10 rubs energetically against the inside surface of the hose 13 creating a frictional electric charge, and is then ejected from the nozzle 4. Insecticide flow is stopped when the spray adjust valve 21 is closed. The quantity of insecticide sprayed can be a regulated by how far the spray adjust valve 21 is opened. The container 11 is reloaded with insecticide by first venting the high pressure section to the atmosphere through the vent 20, opening the lid 14, adding insecticide, sealing the lid 14, and once again pressurizing the system with compressed air. If all the insecticide within the hosing 13 and the nozzle 4 is completely discharged upon completion of spraying, clogging of these parts with hardened insecticide can be prevented.

What is claimed is:

1. A method of applying finely powdered insecticide to exterminate harmful insects under the floor of a house or building, which comprises:
    (a) loading the powdered insecticide into a sealed airtight dispenser so that the insecticide outlet opening is blocked with insecticide;
    (b) pressurizing the dispenser to forcefully deliver insecticide under pressure from said insecticide outlet opening toward a nozzle;
    (c) spraying insecticide at a high speed, from said nozzle, into the enclosed area under the floor of the house or building so that insecticide adheres to all exposed surfaces and in all crevices in said enclosed area under the floor of the house or building;
characterized in that the insecticide is forced out of said insecticide outlet opening and flows with a high flow rate within a hose which flow rate is greater than or equal to 5 m/sec through the hose the length of which is greater than or equal to 5 m, said house having at least an inner surface made of highly electrically resistant synthetic resin, said insecticide being sprayed from said nozzle after being electrically charged by frictional electricity created by friction between the insecticide and the synthetic resin inner surface of the hose.

2. A method of applying finely powdered insecticide to exterminate harmful insects under the floor of a house or building, which comprises:
    (a) loading the powdered insecticide into a sealed airtight dispenser so that the insecticide outlet opening is blocked with insecticide;
    (b) pressurizing the dispenser to forcefully deliver insecticide under pressure from said insecticide outlet opening toward a nozzle;
    (c) spraying insecticide at a high speed, from said nozzle, into the enclosed area under the floor of the house or building so that insecticide adheres to all exposed surfaces and in all crevices in said enclosed area under the floor of the house or building;
characterized in that the insecticide is forced out of said insecticide outlet opening of said sealed airtight dispenser pressured with compressed air at a pressure of between 2 and 15 kg/square cm and high flow rate through a hose the length of which is greater than more equal to 5 m, said hose having at least an inner surface made of highly electrically resistant synthetic resin, said insecticide being sprayed from said nozzle after being electrically charged by frictional electricity created by friction between the insecticide and the synthetic resin inner surface of the hose.

* * * * *